(12) United States Patent
Dare

(10) Patent No.: US 7,025,312 B1
(45) Date of Patent: Apr. 11, 2006

(54) LID HOLDER STAND

(76) Inventor: Jack Dare, P.O. Box 302, Connersville, IN (US) 47331

( * ) Notice: Subject to any disclaimer, the term of this patent is extended or adjusted under 35 U.S.C. 154(b) by 0 days.

(21) Appl. No.: 10/819,074

(22) Filed: Apr. 6, 2004

(51) Int. Cl.
*F16M 11/00* (2006.01)

(52) U.S. Cl. .................. 248/176.1; 211/41.2; 220/744

(58) Field of Classification Search ............ 248/176.1, 248/455, 488, 490, 473, 37.3, 346.01; 211/41.2; 220/744
See application file for complete search history.

(56) References Cited

U.S. PATENT DOCUMENTS

| | | | |
|---|---|---|---|
| 3,028,972 A | 4/1962 | Guillaumant | |
| 3,282,437 A * | 11/1966 | Hansen | 211/41.7 |
| 3,326,387 A | 6/1967 | Princevalle | |
| 4,473,207 A * | 9/1984 | Nascher | 248/490 |
| 4,790,503 A | 12/1988 | Pohler | |
| 4,893,771 A | 1/1990 | Kaneshiro | |
| 4,957,263 A * | 9/1990 | Leluan, Jr. | 248/473 |
| 5,127,616 A | 7/1992 | Carney | |
| 5,396,993 A | 3/1995 | Spitler | |
| 5,979,673 A | 11/1999 | Dooley | |
| D468,163 S | 1/2003 | Blake | |
| 6,604,639 B1 * | 8/2003 | Chen | 211/85.7 |

* cited by examiner

*Primary Examiner*—Ramon O Ramirez

(57) ABSTRACT

Lid holder stands hold pot and pan lids. A cylindrical base has two lid slots, a lid holder slot, and a spoon slot in the top of its sidewall. A base screw hole is present in the portion of the sidewall forming the lid holder slot. A screw is passed through a lid holder screw hole in one end of an arctuate lid holder and inserted into the base screw hole to removably attach one end of the lid holder to the base within the lid holder slot. A lid can have its sidewall removably inserted into the lid slots 24 and the middle of its underside supported by the opposing end of the lid holder, and a spoon can have its handle rested in the spoon slot. The base and lid holder are made of dishwasher safe PVC.

1 Claim, 2 Drawing Sheets

LID HOLDER STAND

BACKGROUND OF THE INVENTION

1. Field of the Invention

The present invention relates to a lid holder stand for use in connection with cooking. The lid holder stand has particular utility in connection with holding pot and pan lids.

2. Description of the Prior Art

Lid holder stands are desirable for holding pot and pan lids. Many cooking procedures require a person to temporarily remove a lid from a pot or pan to stir the contents within. Hot lids, in particular, are especially difficult to manage because they can burn the user and/or scorch the surface on which they are placed. Lid holder stands overcome these challenges by holding hot or cold pot and pan lids away from the user and counters and other surfaces that could be burned by the lid. Lid holder stands have the additional advantage of being dishwasher safe, making them easy to clean if they become soiled.

The use of magnetic cooking utensil holders is known in the prior art. For example, U.S. Pat. No. 5,979,673 to Dooley discloses a magnetic cooking utensil holder. However, the Dooley '673 patent does not have a slot in its base, and has further drawbacks of lacking a base with an open bottom.

U.S. Pat. No. 3,028,972 to Guillaumant discloses a utensil support that serves as a holder for various items, such as pan covers and spoons. However, the Guillaumant '972 patent does not have a base with an open bottom, and additionally does not have a support with only a single point of attachment to the base.

Similarly, U.S. Pat. No. 3,326,387 to Princevalle discloses a portable lid holder that holds lids while a person is temporarily examining the contents of a cooking vessel. However, the Princevalle '387 patent does not have a base with an open bottom, and cannot separate the lid holder from the base.

In addition, U.S. Pat. No. Des. 468,163 to Blake et al. discloses a hot lid holder with drip pan that holds a lid. However, the Blake et al. '163 patent does not have a base with an open bottom, and also does not have a support with only a single point of attachment to the base.

Furthermore, U.S. Pat. No. 4,790,503 to Pohler discloses a hot lid holder that holds the lid of a cooking utensil, such as a pot, pan, or dish. However, the Pohler '503 patent does not have a base with an open bottom, and further lacks rods with only a single point of attachment to the base.

U.S. Pat. No. 5,127,616 to Carney discloses a pot lid and utensil holder that holds pot lids and/or cooking utensils. However, the Carney '616 patent does not have a separable lid holder, and has the additional deficiency of lacking a base with an open bottom.

Furthermore, U.S. Pat. No. 5,396,993 to Spitler discloses a kitchen utensil holder that temporarily stores or holds kitchen implements when not in use during a cooking procedure. However, the Spitler '993 patent does not have a base with an open bottom, and further lacks multiple slots in its base.

Lastly, U.S. Pat. No. 4,893,771 to Kaneshiro discloses a cooking pot lid stand that is a stand for cooking pot lids, serving dish lids, casserole dish woods, or other lids which have a handle or knob at its top center. However, the Kaneshiro '771 patent does not a slot in its base, and has the additional deficiency of being unable to hold cooking utensils lacking a handle or knob at their top center.

While the above-described devices fulfill their respective, particular objectives and requirements, the aforementioned patents do not describe a lid holder stand that allows holding pot and pan lids. The Dooley '673 patent, and the Kaneshiro '771 patent make no provision for a slot in their bases. The Dooley '673 patent, the Guillaumant '972 patent, the Princevalle '387 patent, the Blake et al. '163 patent, the Pohler '503 patent, the Carney '616 patent, and the Spitler '993 patent lack a base with an open bottom. The Guillaumant '972 patent, the Blake et al. '163 patent, and the Pohler '503 patent do not have support with only a single point of attachment to the base. The Princevalle '387 patent and the Carney '616 patent omit a lid holder that can be separated from the base. The Spitler '993 patent does not have multiple slots in its base. The Kaneshiro '771 patent cannot hold cooking utensils lacking a handle or knob at their top center.

Therefore, a need exists for a new and improved lid holder stand that can be used for holding pot and pan lids. In this regard, the present invention substantially fulfills this need. In this respect, the lid holder stand according to the present invention substantially departs from the conventional concepts and designs of the prior art, and in doing so provides an apparatus primarily developed for the purpose of holding pot and pan lids.

SUMMARY OF THE INVENTION

In view of the foregoing disadvantages inherent in the known types of magnetic cooking utensil holders now present in the prior art, the present invention provides an improved lid holder stand, and overcomes the above-mentioned disadvantages and drawbacks of the prior art. As such, the general purpose of the present invention, which will be described subsequently in greater detail, is to provide a new and improved lid holder stand which has all the advantages of the prior art mentioned heretofore and many novel features that result in a lid holder stand which is not anticipated, rendered obvious, suggested, or even implied by the prior art, either alone or in any combination thereof.

To attain this, the present invention essentially comprises a base with one end of a lid holder attached to it and a plurality of lid slots defined by one end of its sidewall.

There has thus been outlined, rather broadly, the more important features of the invention in order that the detailed description thereof that follows may be better understood and in order that the present contribution to the art may be better appreciated.

The invention may also include a lid holder slot defined by one end of the sidewall of the base, a base screw hole defined by the portion of the sidewall that forms the lid holder slot, a lid holder screw hole defined by one end of the lid holder, and a screw with one end inserted through the lid holder screw hole and threadedly inserted into the base screw hole to removably secure the end of the lid holder to the base. The lid slots may be aligned with one another. There may be a spoon slot defined by one end of the sidewall. The spoon slot and lid holder slot may be aligned with one another. The base may be about 5 in. in diameter. The lid holder stand may be about 6 in. high. The base may be generally cylindrical in shape. The lid holder may be arctuate in shape. The lid holder may be a segment of a circle. The lid holder stand may be dishwasher safe. The lid holder in the base may be selected from the group consisting of plastic, steel, aluminum, titanium, and carbon fiber composite. The lid slots may be adapted to receive the sidewall of a lid. The spoon slot may be adapted to receive the handle of a spoon. The middles of the lid slots, the spoon slot, and lid holder slot may divide the end of the sidewall of the base into four approximately equal portions. The base may be round. One end of the arctuate lid holder may be removably inserted into the lid holder slot. There are, of course, additional features of the invention that will be described hereinafter and which will form the subject matter of the claims attached.

Numerous objects, features, and advantages of the present invention will be readily apparent to those of ordinary skill in the art upon a reading of the following detailed description of presently current, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved lid holder stand that has all of the advantages of the prior art magnetic cooking utensil holders and none of the disadvantages.

It is another object of the present invention to provide a new and improved lid holder stand that may be easily and efficiently manufactured and marketed.

An even further object of the present invention is to provide a new and improved lid holder stand that has a low cost of manufacture with regard to both materials and labor, and which accordingly is then susceptible of low prices of sale to the consuming public, thereby making such lid holder stand economically available to the buying public.

Still another object of the present invention is to provide a new lid holder stand that provides in the apparatuses and methods of the prior art some of the advantages thereof, while simultaneously overcoming some of the disadvantages normally associated therewith.

Even still another object of the present invention is to provide a lid holder stand for holding pot and pan lids. This allows the user to protect themselves and their counters from being burned by a hot lid.

Still yet another object of the present invention is to provide a lid holder stand for holding pot and pan lids. This makes it possible to protect a stovetop from stains.

An additional object of the present invention is to provide a lid holder stand for holding pot and pan lids. This provides a location for placing a lid while stirring foods.

A further object of the present invention is to provide a lid holder stand for holding pot and pan lids. This allows the user to easily clean the lid holder stand.

Lastly, it is an object of the present invention to provide a new and improved lid holder stand for holding pot and pan lids.

These together with other objects of the invention, along with the various features of novelty that characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there is illustrated current embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE CURRENT EMBODIMENT

Figures 1, 2:
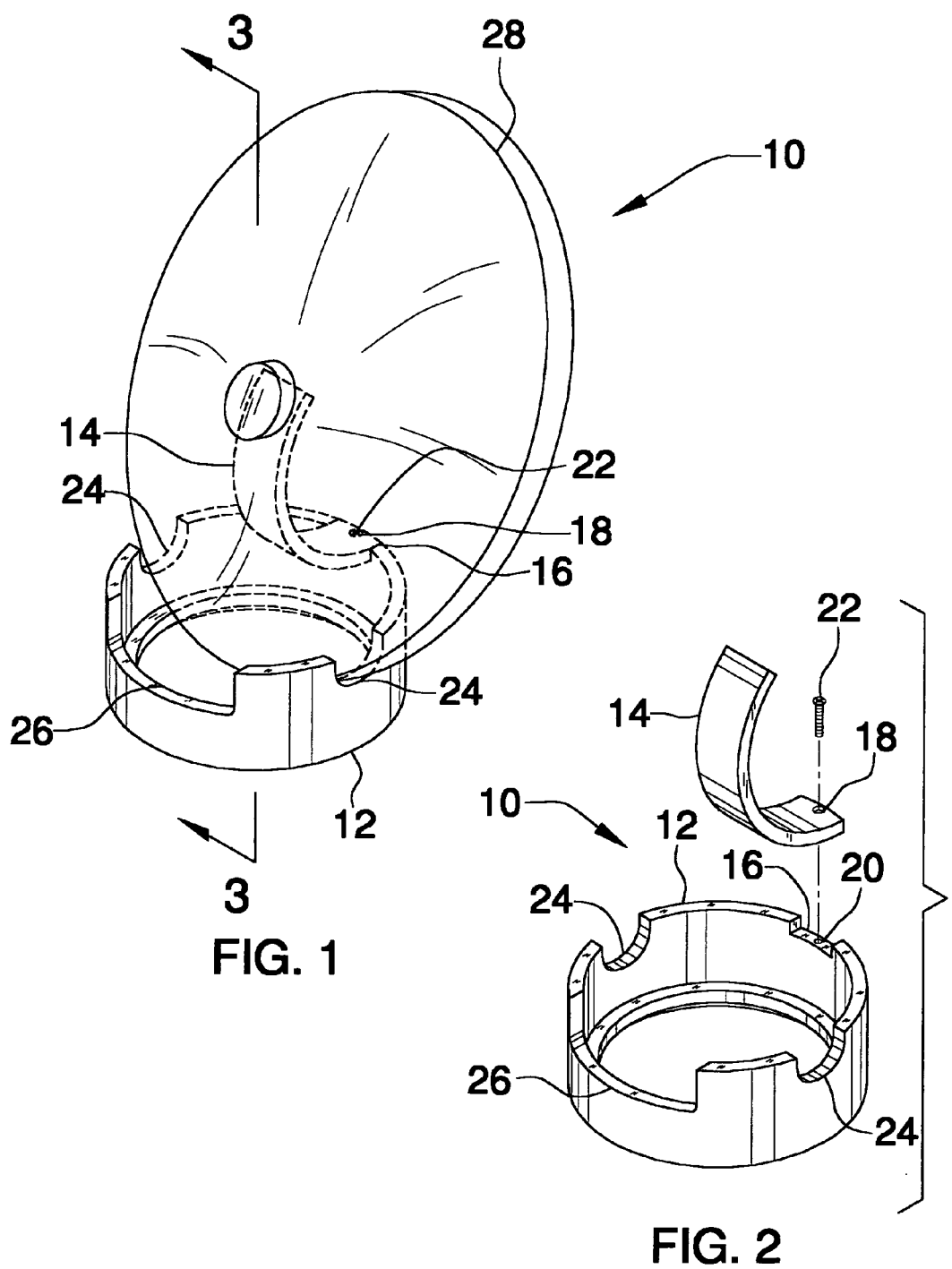
FIG. 1 is a top perspective view of the current embodiment of the lid holder stand constructed in accordance with the principles of the present invention.
FIG. 2 is a top perspective exploded view of the lid holder stand of the present invention.
Figure 3:
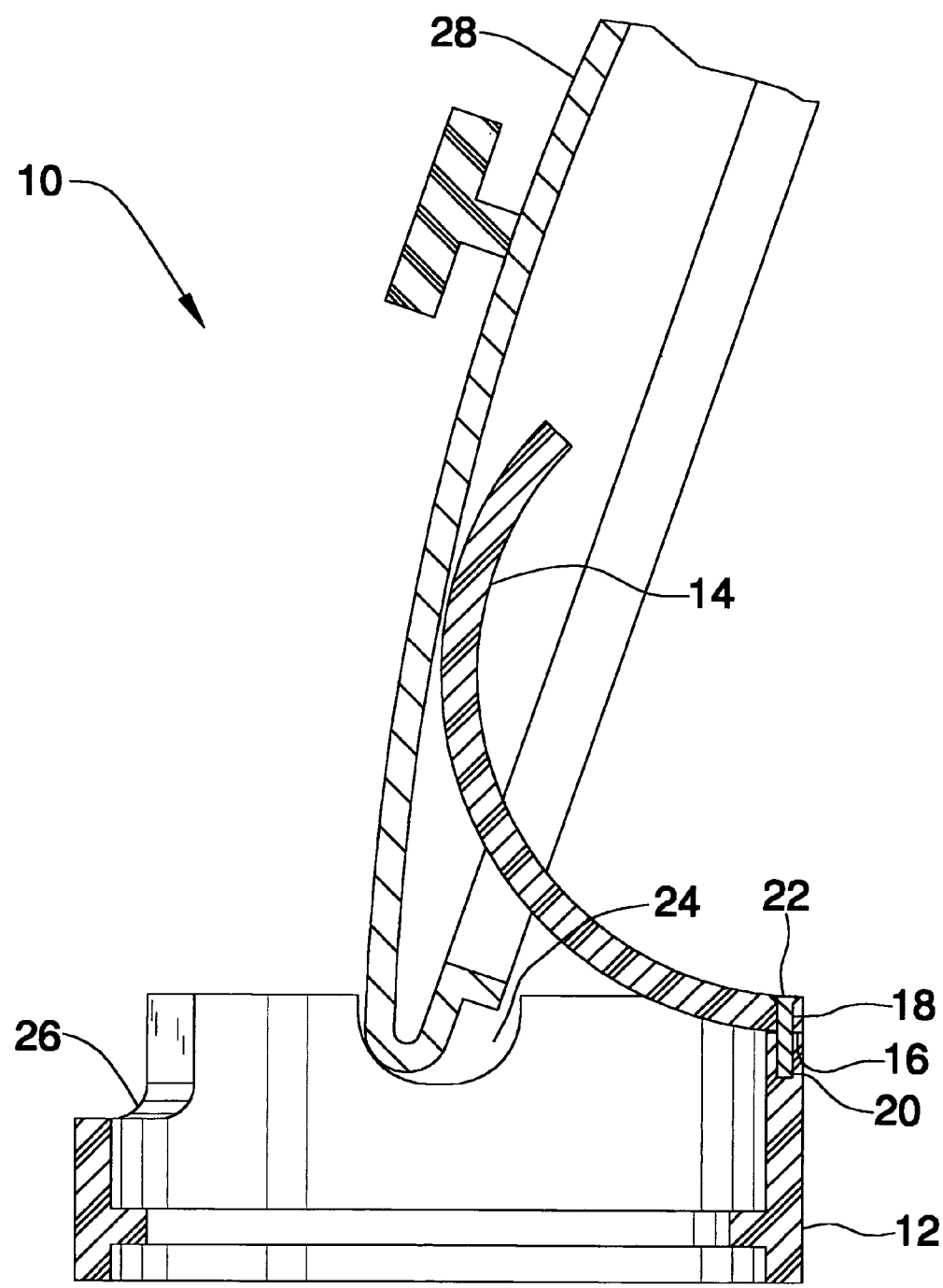
FIG. 3 is a side sectional view of the lid holder stand of the present invention.

Referring now to the drawings, and particularly to FIGS. 1–3, a current embodiment of the lid holder stand of the present invention is shown and generally designated by the reference numeral 10.

In FIG. 1, a new and improved lid holder stand 10 of the present invention for holding pot and pan lids is illustrated and will be described. More particularly, the lid holder stand 10 has a base 12 with a lid holder slot 16, spoon slot 26, and two lid slots 24 in the top of its sidewall. The middles of the lid holder slot 16, spoon slot 26, and two lid slots 24 are arranged to divide the top of the base 12 into four roughly equal portions. The two lid slots 24 are outlined with respect to one another, as are the lid holder slot 16 and spoon slot 26. A screw 22 has one end inserted through a lid holder screw hole 18 to removably secure one end of a lid holder 14 to the base 12 within lid holder slot 16. The lid holder stand 10 is shown in use with the sidewall of a lid 28 removably inserted into the lid slots 24 and the middle of the underside of the lid 28 supported by the opposing end of the lid holder 14. In the current embodiment, lid holder 14 and base 12 are made of PVC. Base 12 is cylindrical in shape and lid holder 14 is a segment of a circle in the current embodiment. Note that the lid 28 is for illustrative purposes only and is not part of the current invention.

Moving on to FIG. 2, a new and improved lid holder stand 10 of the present invention for holding pot and pan lids is illustrated and will be described. More particularly, the lid holder stand 10 has a base 12 with lid slots 24, lid holder slot 16, and spoon slot 26 in the top of its sidewall. A base screw hole 20 is present in the middle of the portion of the base 12 that defines the lid holder slot 16. A screw 22 has one end inserted through the lid holder screw hole 18 in one end of the lid holder 14 and threadedly inserted into the base screw hole 20 to removably secure the lid holder 14 to the base 12 within the lid holder slot 16.

Concluding with FIG. 3, a new and improved lid holder stand 10 of the present invention for holding pot and pan lids is illustrated and will be described. More particularly, the lid holder stand 10 has a base 12 with a lid holder slot 16, spoon slot 26, and lid slot 24 in the top of its sidewall. A screw 22 is inserted through a lid holder screw 18 in one end of a lid holder 14 and into a base screw hole 20 in the portion of the top of the sidewall of base 12 that defines the lid holder slot 16 to releasably secure one end of the lid holder 14 to the base 12 within the lid holder slot 16. The lid holder stand 10 is shown in use with the sidewall of a lid 28 removably inserted into the lid slot 24 and the opposing end of the lid holder 14 supporting the middle of the underside of the lid 28. Note that the lid 28 is for illustrative purposes only and is not part of the current invention.

In use, it can now be understood that the user assembles the lid holder stand 10 by placing one end of the lid holder 14 in the lid holder slot 16 and aligning the lid holder screw hole 18 and the base screw hole 20. A screw 22 is inserted through the lid holder screw hole 18 and into the base screw hole 20 to removably attach the end of the lid holder 14 to the base 12. As needed, a user can rest the handle of a spoon within the spoon slot 26 or can rest a lid 28 by placing its sidewall within the lid slots 24 and resting the middle of its underside against the opposing end of the lid holder 14. If the lid holder stand 10 becomes soiled, it can be placed in a dishwasher for cleaning and can be optionally disassembled for washing or storage by removing the screw 22 from the lid holder screw hole 18 and base screw hole 20.

While a current embodiment of the lid holder stand has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as steel, aluminum, titanium, or carbon fiber composite may be used instead of the PVC base described. Also, the PVC lid holder may also be made of steel, aluminum, titanium, carbon fiber composite, or similar material. And although holding pot and pan lids has been described, it should be appreciated that the lid holder stand herein described is also suitable for holding a wide range of disc-shaped objects. Furthermore, a wide variety of lid holder shapes may be used instead of the arctuate shape described.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A lid holder stand comprising:
   a round base having a sidewall and opposing open ends;
   a plurality of lid slots, wherein one end of said sidewall defines slots therein to comprise said lid slots;
   a lid holder slot, wherein one end of said sidewall of said base defines a slot therein to comprise said lid holder slot;
   a base screw hole, wherein the portion of said sidewall that forms said lid holder slot defines a hole therein to comprise said base screw hole;
   an arctuate lid holder having opposing ends with one end removably inserted into said lid holder slot;
   a lid holder screw hole, wherein said end of said lid holder defines a hole therein to comprise said lid holder screw hole;
   a screw having opposing ends with one end inserted through said lid holder screw hole and threadedly inserted into said base screw hole to removably secure said end of said lid holder to said base; and
   a spoon slot, wherein one end of said sidewall defines a slot therein to comprise said spoon slot.

* * * * *